(12) United States Patent
Schmitz et al.

(10) Patent No.: US 11,684,059 B2
(45) Date of Patent: Jun. 27, 2023

(54) AGRICULTURAL SPRAYER CONTROL SYSTEM

(71) Applicant: AGCO International GmbH, Neuhausen (CH)

(72) Inventors: Lars Schmitz, Grubbenvorst (NL); Hans Stols, Grubbenvorst (NL)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 17/594,755

(22) PCT Filed: May 26, 2020

(86) PCT No.: PCT/EP2020/064585
§ 371 (c)(1),
(2) Date: Oct. 28, 2021

(87) PCT Pub. No.: WO2020/239771
PCT Pub. Date: Dec. 3, 2020

(65) Prior Publication Data
US 2022/0202002 A1 Jun. 30, 2022

(30) Foreign Application Priority Data
May 30, 2019 (GB) ..................................... 1907664

(51) Int. Cl.
*A01M 7/00* (2006.01)
(52) U.S. Cl.
CPC ................................. *A01M 7/0089* (2013.01)

(58) Field of Classification Search
CPC .................................................. A01M 7/0089
See application file for complete search history.

(56) References Cited

U.S. PATENT DOCUMENTS

| 6,126,088 A | 10/2000 | Wilger et al. |
| 2009/0099737 A1 | 4/2009 | Wendte et al. |
| 2009/0192654 A1* | 7/2009 | Wendte ............... A01M 7/0057 47/58.1 SC |
| 2013/0103211 A1* | 4/2013 | Peterson .............. A01B 79/005 700/284 |

(Continued)

FOREIGN PATENT DOCUMENTS

| CN | 108013019 A | 5/2018 |
| CN | 108 812 591 A | 11/2018 |

(Continued)

OTHER PUBLICATIONS

UK Intellectual Property Office, Search Report for UK Priority Application No. GB 1907664.5, dated Nov. 25, 2019.

(Continued)

*Primary Examiner* — Tuongminh N Pham (57) ABSTRACT

An agricultural sprayer has a fluid delivery network that supplies one or more sets of spaced-apart nozzles for the application of plant protection products. An electronic controller is arranged to receive and store an operating parameter for each one of a plurality of drift reduction classes. The operating parameter may be an upper pressure limit. The controller is operable to control at least one of a pump, a vehicle speed, a nozzle selection, and a display based on the operating parameter of a selected one of the plurality of drift reduction classes.

16 Claims, 8 Drawing Sheets

(56) References Cited

U.S. PATENT DOCUMENTS

| | | | |
|---|---|---|---|
| 2013/0105591 A1* | 5/2013 | Peterson | A01B 79/005 239/71 |
| 2015/0375247 A1* | 12/2015 | Funseth | B05B 1/20 239/69 |
| 2016/0015020 A1 | 1/2016 | Needham et al. | |
| 2017/0251656 A1 | 9/2017 | Kolb et al. | |
| 2017/0348718 A1 | 12/2017 | Preheim et al. | |
| 2019/0174751 A1* | 6/2019 | Parrish | A01N 39/04 |
| 2020/0037599 A1 | 2/2020 | Oliver et al. | |

FOREIGN PATENT DOCUMENTS

| | | |
|---|---|---|
| DE | 102016224781 A1 | 6/2018 |
| EP | 0086031 A1 | 8/1983 |
| EP | 0 847 307 A1 | 6/1998 |
| EP | 0 847 307 B1 | 1/2003 |
| EP | 211 1094 A1 | 10/2009 |
| GB | 207 65 44 A | 12/1981 |
| GB | 2377034 A | 12/2002 |
| JP | S54 129129 A | 10/1979 |
| JP | 2001018684 A | 1/2001 |
| JP | 2002 125567 A | 5/2002 |
| WO | 2012/091990 A1 | 7/2012 |
| WO | 2016/153336 A1 | 9/2016 |

OTHER PUBLICATIONS

European Patent Office, International Search Report for parent International Application No. PCT/EP2020/064585, dated Aug. 4, 2020.

European Patent Office, EP Patent Register for EP 0847307, stating "the application published by WIPO in one of the EPO official languages on Apr. 10, 1997 takes the place of the publication of the European patent application", register obtained from EPO website on Jan. 17, 2021. The submitted WIPO Publication is the only Publication of EP 0847307 A1 available in public search.

* cited by examiner

AGRICULTURAL SPRAYER CONTROL SYSTEM

CROSS-REFERENCE TO RELATED APPLICATIONS

This application is a national phase entry under 35 U.S.C. § 371 of International Patent Application PCT/EP2020/064585, filed May 26, 2020, designating the United States of America and published in English as International Patent Publication WO 2020/239771 A1 on Dec. 3, 2020, which claims the benefit of and priority from United Kingdom Application No. 1907664.5, filed May 30, 2019, the entire disclosure of each of which is hereby incorporated by reference.

TECHNICAL FIELD

This disclosure relates to the control of agricultural sprayer machines used to apply pesticides and other inputs to crop fields and typically comprising a fluid delivery network with a pump in hydraulic communication with a plurality of spaced-apart nozzles.

BACKGROUND

Agricultural sprayers are used by farmers and contractors to apply pesticides and other nutrient-containing solutions to crop fields. Sprayers can be mounted to, or towed by, a tractor or other suitable vehicle, or may be self-propelled with an integrated means of propulsion and a driver's cab. The sprayer machine typically includes a storage tank for the liquid to be applied, the tank being filled as required by the operator. Alternatively, in systems which offer lower ground pressure, the sprayer machine may be semi-permanently connected by a pipe to a local (field-based) bowser, wherein the applied liquid is supplied via a pipe from the bowser to the sprayer continuously as the sprayer is repeatedly moved across the crop field.

The liquid is applied to the field by a number of discharge devices mounted in a spaced relationship along the length of a boom which, itself, is mounted to the sprayer vehicle. The discharge devices are each connected to the storage tank by a fluid delivery network comprising various pipes, valves, pumps and other plumbing, and at least one nozzle. The liquid is typically atomized by the nozzle and applied to the crop in a jet of mist for example.

The fluid delivery network operates at a variable system pressure to create an expulsion force for the liquid. The system pressure is generally proportional to the flow rate of the liquid through the nozzles with a quadratic relationship, and can be adjusted in dependence on a groundspeed to deliver a target application rate to the crop field, the higher the system pressure the greater the flow rate.

The system pressure is known to have an effect on the droplet size of the applied liquid. A lower system pressure produces a larger droplet size, whereas a higher system pressure produces a smaller droplet size or finer mist. Therefore, for a given nozzle, the physical properties of the applied liquid can change with groundspeed as the system pressure is adjusted 'on-the-fly' to deliver the target application rate.

The physical properties of the applied liquid can affect the efficacy of the pesticide and/or the drift characteristics. For example, a finer mist (produced at higher system pressures) typically delivers better surface coverage of the crop or ground and thus greater pesticide efficacy. However, a finer mist is also more vulnerable to drift caused by ambient wind conditions for example, whereas a larger droplet size (produced at lower system pressures) reduces the risk of drift.

One approach for reducing drift includes air induction nozzles which use the venturi effect to introduce air into the spray droplets as the liquid is forced through the nozzle. The air induction makes the droplets less susceptible to drift.

Drift-reducing technology has also led to the introduction of drift reduction classes for nozzles in which marketed nozzles are certified as meeting drift reduction classes, for example 50%, 75%, 90% drift reducing, when operated within specified pressure ranges. For example, a nozzle may be certified as delivering 75% drift reduction when operated at pressures between 1.5 bar and 3.0 bar. In operation therefore, in order to meet 75% drift reduction the operator must ensure that the pressure does not exceed 3.0 bar.

It is known to provide multi-nozzle discharge devices which comprise two or more nozzles that can be activated independently. The chosen nozzles typically have different flow rate characteristics. Each nozzle, or combination thereof, can be activated to deliver different droplet sizes for a given application rate. Or, in other words, each nozzle combination is capable of delivering different flow rates at a given pressure. The nozzle, or nozzle combination, can thus be selected to cater for the current conditions and/or to deliver the desired result. For example, in windy conditions, a nozzle with a higher flow rate delivery may be selected so that the sprayer can operate at a lower system pressure and produce a courser mist.

In the case where multiple nozzle sets are available to the operator, each nozzle set (including combinations of nozzles) may have a different pressure range specification for the different drift reduction classes.

Legal approval of some pesticide products is known require a spray operator to apply the product at a given drift reduction class, but this requirement is often limited to buffer zones around field features that present a raised pollution risk. For example the operator may be required to spray the product with 90% drift reduction within a 25-meter zone from the field boundary but only with 50% drift reduction away from that zone. Monitoring the operating pressure to ensure that the drift reduction class requirements are met is particularly onerous, especially when multiple nozzle sets with different drift reduction requirements are available.

BRIEF SUMMARY

In some embodiments, an agricultural spraying machine has a fluid delivery network with a pump in hydraulic communication with a plurality of spaced-apart nozzles, and an electronic controller configured to receive and store an operating parameter for each one of a plurality of drift reduction classes. The controller is operable to control at least one of the pump, a vehicle speed, a nozzle selection, and a display based on the operating parameter of a selected one of the plurality of drift reduction classes.

By storing the operating parameters for a plurality of drift reduction classes, the sprayer can be controlled in accordance with those drift reduction classes with greater ease for the operator.

The term 'hydraulic communication' should be understood to refer to an arrangement wherein fluid can flow between first and second components that are in hydraulic communication with one another, and includes, inter alia, an arrangement having intermediate components between the first and second components through which fluid can flow.

The operating parameter is preferably an upper pressure limit. The spraying machine preferably further comprises a pressure sensor arranged to measure a pressure of the fluid delivery network. The controller may also receive and store for each one of the plurality of drift reduction classes a lower pressure limit. In an alternative embodiment, the operating parameter may be droplet size wherein the droplet size of the applied spray is measured using optical sensing, for example.

In one embodiment, the pump is controlled to maintain the pressure below the upper pressure limit of the selected one of the plurality of drift reduction classes. Control of the pump in conjunction with sensing of the pressure may simply serve to prevent the pressure from exceeding the pressure limit of a selected drift reduction class.

In one embodiment, an operator may enter the operating parameter for each one of the plurality of drift reduction classes through a user interface device connected to the controller. For example, the user interface device may comprise a keyboard or a touch-sensitive display.

In one embodiment, the controller is configured to receive an application rate setpoint, a nozzle reference flow, and a nozzle reference pressure; and calculate an active speed setpoint based upon the application rate setpoint, the nozzle reference flow, the nozzle reference pressure, and the operating parameter of the selected one of the plurality of drift reduction classes. The active speed setpoint may be used in an active manner in which a forward speed of the machine is limited at or below the active speed setpoint, or in a passive manner in which the active speed setpoint is simply displayed on the display for guidance for the operator. A speed setpoint is thus calculated on the basis of a selected drift reduction class wherein a change in the selected drift reduction class may result in a change of the speed setpoint, caused by a lower permitted upper pressure, for example.

Although applicable to sprayer machines that have a single basic set of spaced nozzles, this disclosure lends itself particularly well to multi-nozzle arrangements. In one embodiment, the sprayer machine has a plurality of nozzle groups disposed in a mutually spaced relationship and connected to the fluid delivery network. Each nozzle group has a plurality of nozzles that can be independently activated, and when activated, a nozzle from the plurality of nozzles is put into hydraulic communication with the fluid delivery network. The controller is configured to receive and store for each nozzle in the nozzle groups a respective operating parameter for each one of the plurality of drift reduction classes.

The controller may also be configured to automatically select and activate one or more nozzles from each nozzle group based upon the operating parameter of a currently selected drift reduction class. For example, reaching an upper pressure limit for one set of nozzles operating according to a given drift reduction class may cause the controller to automatically switch to a different set of nozzles that allow a faster forward speed while still meeting the application rate setpoint and the given drift reduction requirements.

It should be understood that the term ‘nozzle group’ used herein is intended to refer to a spray discharge device having a plurality of nozzles that can be independently activated, wherein the group of device represents a repeating unit along a boom for example, the unit being spaced at regular intervals. The term ‘nozzle set’ used herein is intended to refer to one or more nozzles from each of the nozzle groups to include spaced nozzles, or combinations of nozzles, of the same type or having the same flow characteristics along the operating width of the sprayer. A nozzle set may include a combination of different nozzles from each nozzle group or only single nozzles from each nozzle group.

In another embodiment, the controller is configured to calculate a speed range for each of the plurality of drift reduction classes, and to automatically select and activate a nozzle set based upon a sensed actual speed and the speed range.

In yet another embodiment, the controller is configured to select one of the plurality of drift reduction classes based upon a location identifier. The location of the sprayer may be obtained through a global satellite navigation system associated with a tractor attached to the sprayer, for example. Used in conjunction with an application map that identifies zones for different drift reduction classes, the location identifier enables the controller to automatically select the drift reduction class and retrieve the stored operating parameters associated therewith.

Another embodiment includes a method of controlling an agricultural spraying machine having a fluid delivery network with a pump in hydraulic communication with a plurality of spaced-apart nozzles. The method includes receiving and storing a respective operating parameter for each one of a plurality of drift reduction classes, selecting one of the plurality of drift reduction classes, and controlling one of the pump, a vehicle speed, a nozzle selection, and a display based upon the operating parameter associated with the selected drift reduction class.

According to yet another embodiment, a controller for an agricultural sprayer machine is configured to receive an application rate setpoint, a pressure setpoint, a nozzle reference flow, and a nozzle reference pressure; calculate a speed setpoint based upon the application rate setpoint, the nozzle reference flow, the nozzle reference pressure, and the pressure setpoint; and control at least one of a forward speed and a display based upon the speed setpoint.

Another embodiment includes a method of controlling an agricultural spraying machine comprising receiving an application rate setpoint, an upper pressure limit, a nozzle reference flow, and a nozzle reference pressure; calculating a speed setpoint based upon the application rate setpoint, the nozzle reference flow, the nozzle reference pressure and the upper pressure limit; and controlling at least one of a forward speed and a display based upon the speed setpoint.

Another method includes automatically selecting a nozzle set from a plurality of nozzle sets on an agricultural spraying machine. The method includes receiving an application rate setpoint, and for each nozzle set an upper pressure limit, a lower pressure limit, a nozzle reference flow and a nozzle reference pressure; calculating a speed range for each nozzle set, wherein each speed range comprises a lower speed limit and an upper speed limit; sensing a forward speed of the spraying machine; and selecting one of the nozzle sets based upon the forward speed and the speed ranges.

BRIEF DESCRIPTION OF THE DRAWINGS

Further advantages will become apparent from reading the following description of specific embodiments in which:

FIG. 1 is a plan view of a tractor and pull-type sprayer combination suitable for implementation of embodiments disclosed herein;

FIG. 2 is a diagrammatic view of part of the spraying machine in accordance with an embodiment showing some nozzles connected to the fluid delivery network;

FIG. 3 is a block diagram of part of a spraying machine in accordance with an embodiment;

DETAILED DESCRIPTION

While the disclosure will be described in connection with these drawings, there is no intent to limit to the embodiment or embodiments disclosed herein. Although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications, and equivalents included within the scope of the disclosure as defined by the appended claims. Further, it should be appreciated in the context of the present disclosure that the claims are not necessarily limited to the particular embodiments set out in the description.

Figure 1:
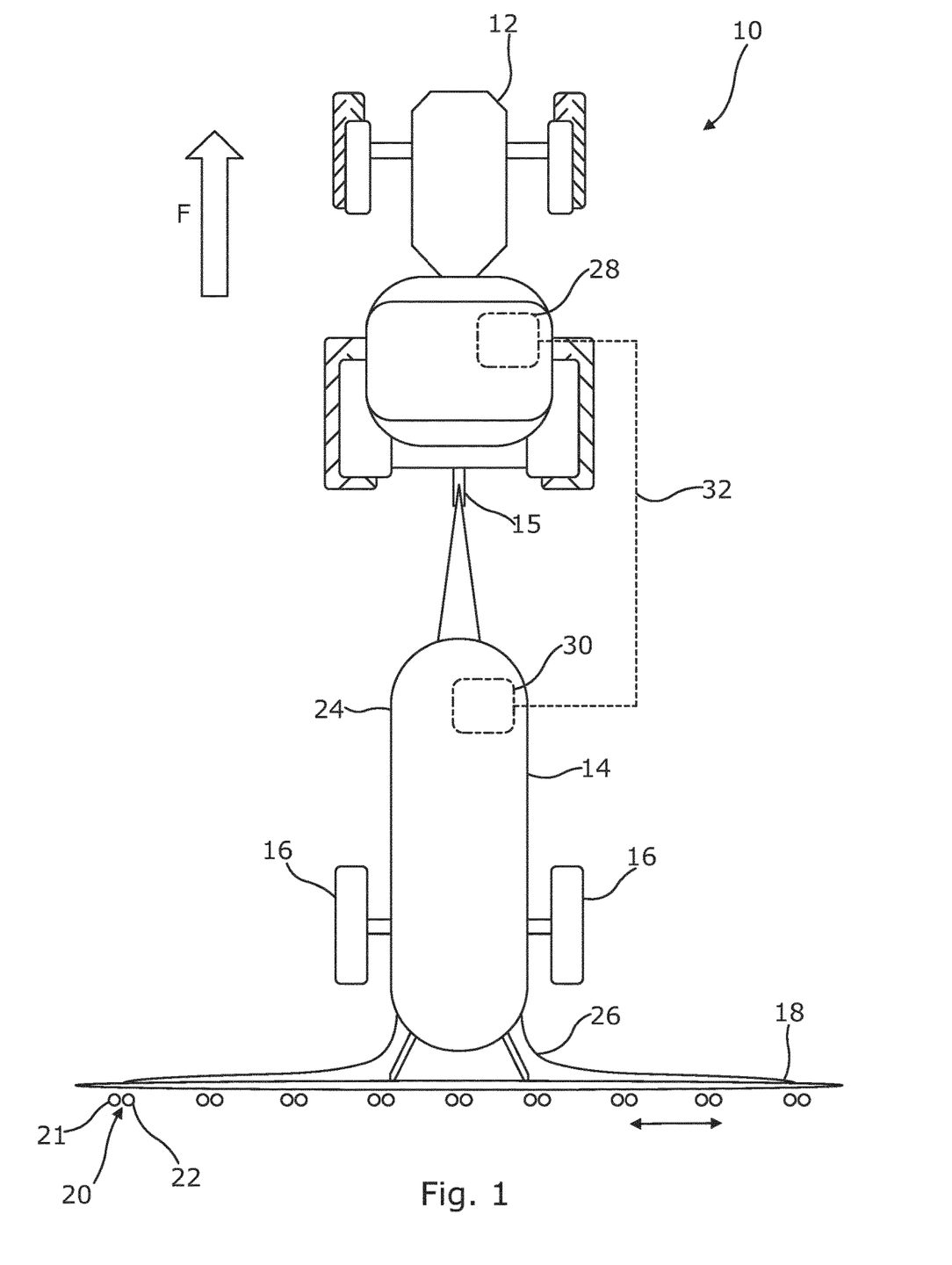

With reference to FIG. 1, an agricultural spraying machine 10 is illustrated in the form of an agricultural tractor 12 and trailed sprayer 14 combination wherein the sprayer 14 is attached to the tractor 12 at a hitch 15 in a known manner. The tractor 12 and sprayer 14 are driven in a generally forward direction (arrow F) through crop fields to apply pesticides or other nutrient-containing solutions to a growing plant or directly on to the ground. The sprayer 14 is of a generally known pull-type construction and includes ground-engaging wheels 16 and a spray boom 18 which extends transversely with respect to the forward direction F.

It will be appreciated that although a tractor and trailed sprayer combination is illustrated in FIG. 1, embodiments can be implemented in other types of agricultural sprayer machines including mounted sprayers and self-propelled sprayers.

Although not shown in FIG. 1, the spray boom 18 may comprise a number of boom sections which are foldable into transport position as is well known in the art. It should be appreciated that the spray boom 18 shown in FIG. 1 is not necessarily to scale and is shown in schematic form only. For example, the spray boom 18 may extend up to widths of around 48 meters.

Figure 2:
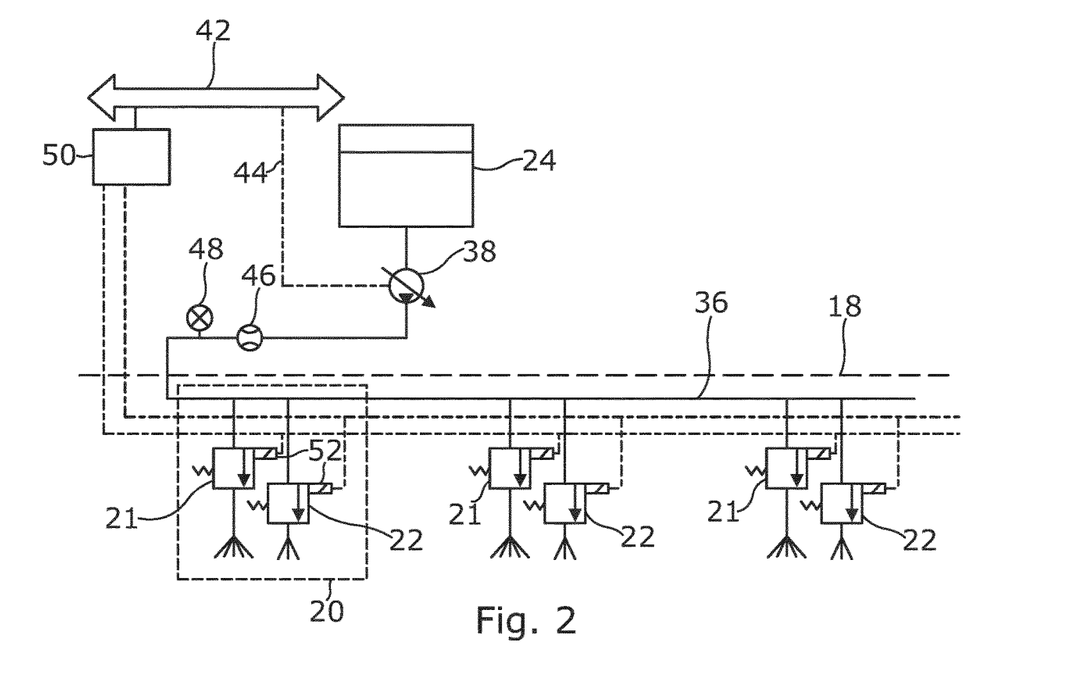

With reference also to FIG. 2, mounted to the boom 18 are a plurality of nozzle groups 20 disposed in a mutually-spaced relationship at a distance 'z'. Each nozzle group 20 includes two individually-controllable nozzles 21, 22, wherein the nozzles 21, 22 for each group have the same flow characteristics. In other words, each nozzle group has a first nozzle 21 of a first type and a second nozzle 22 of a second type which is typically different from the first type. The details and control of the nozzles 21, 22 will be described in more detail below.

Turning back to the sprayer 14, a chemical tank 24 is provided on a frame for the storage of the chemical solution to be applied. A fluid delivery network 26 is represented schematically in FIG. 1, and serves to hydraulically connect the chemical tank 24 with the nozzles 21, 22. Further details of the fluid delivery network 26 will also described in more detail below.

In the illustrated embodiment, a first electronic control unit (ECU) 28 is located on the tractor 12 and a second ECU 30 is located on the sprayer 14. The ECUs 28, 30 are connected by wired or wireless connection 32 which allows the controllers 28, 30 to communicate according to the ISO standard 11783 'ISOBUS'. ISOBUS facilitates a mutual communication between implements and tractors regardless of the OEM and, in this case, enables data collected and generated by sprayer ECU 30 to be communicated to tractor ECU 28.

Although two ECUs 28, 30 are disclosed in the illustrated embodiment, it should be understood that the control logic described may be carried out on one or both of the tractor 12 and sprayer 14. For example, the control components described may be located on the sprayer 14 alone. It should be understood, therefore, that references to controller 34 hereinafter are in relation to ECU 28, 30 wherein the components and functionality of controller 34 may be located in one of the tractor ECU 28 and sprayer ECU 30 or distributed across both.

The controller 34 may be embodied as a custom-made or commercially available processor, an auxiliary processor among several processors (although simplicity in component numbers is desirable for AAM), a semi-conductor micro-processor (in the form of a microchip), a macro processor, one or more application specific integrated circuits (ASICS), a plurality of suitably configured digital logic gates, and/or other well-known electrical configurations comprising discrete elements both individually and in various combinations to coordinate the overall operation of the controller 34.

The controller 34 includes a memory 62 that may include onboard storage devices represented by read-only (ROM) and random-access (RAM) devices (not shown).

When certain embodiments of the control systems are implemented at least in part as software (including firmware), it should be noted that alternatively or in addition to ROM, the software can be stored on a variety of non-transitory computer-readable medium for use by, or in connection with, a variety of computer-related systems or methods. In the context of this disclosure, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable media for use by, or in connection with, an instruction execution system, apparatus, or device, such as a computer-based system, processor-containing system, or other system that can fetch the instructions from the instruction execution system, apparatus, or device and execute the instructions.

When certain embodiments of the control systems are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Turning to FIG. 2, three nozzle groups 20 each having two nozzles 21, 22 are shown. Although not shown in detail, each nozzle 21, 22 is mounted upon the rigid structure of boom 18 (FIG. 1). It should also be appreciated that a typical sprayer will include perhaps several tens of nozzle groups 20 and that only three are illustrated in FIG. 2 for clarity of explanation. Furthermore, the nozzle groups 20 may comprise more than two nozzles.

The fluid delivery network 26 includes a fluid supply line 36 which hydraulically connects a variable flow pump 38 to the nozzles 21, 22 located on the boom 18. The pump 38 pressurizes the fluid supply line 36 by pumping chemical solution from tank 24. Pump 38 may be one of various suitable types including roller vein pumps, centrifugal pumps, diaphragm pumps, and axial-piston pumps, by way of example. The output of the pump 38 is controlled by a rate controller 40 which is part of the controller 34 and connected to the pump 38 via a databus 42 and an electronic connection 44.

Although a databus 42 is shown and described, the various electronic components can be connected directly without the use of a databus without deviating from the scope of the disclosure.

The volumetric flow through the fluid delivery line 36 is measured by a flowmeter 46. The pressure of the fluid delivery line 36 is measured by a pressure sensor 48. Both the flowmeter 46 and the pressure sensor 48 are in electronic communication with controller 34 via the databus 42.

It will be appreciated that the fluid control circuit (or part thereof) shown in FIG. 2 is highly simplified and various other components which would typically be included such as a clean water rinse tank, a chemical inductor, return lines, etc., have been excluded for the sake of simple explanation.

Each nozzle 21, 22 is plumbed in to the fluid delivery line 36 with a respective connection which comprises a respective electrical solenoid valve 52 for selectively activating the nozzle 21, 22. Each solenoid valve 52 is electrically connected to a nozzle controller 50 which is in communication with databus 42 and is embodied in controller 34. The nozzle controller 50 selectively activates and deactivates the independently controllable nozzles 21, 22. In an alternative embodiment the solenoids are replaced with electrical motors.

The output of each nozzle 21, 22 is proportional in a quadratic relationship to the pressure p in the fluid delivery line 36, wherein a greater pressure leads to a higher output flow and a lower pressure leads to a lower output flow.

For the sake of explanation, the illustrated embodiment has nozzles 21 having a first flow characteristic and nozzles 22 having a second flow characteristic that is different from the first. It should be understood that the term "flow characteristic" relates generally to the output flow rate of a given nozzle at a reference pressure. It is known in the art that nozzles having different flow characteristics are available so as to meet a desired application rate within a desired pressure range for example. Such nozzle flow characteristics may be identified by a known color-coding system.

Although shown schematically in FIGS. 1 and 2, it should be appreciated that nozzle groups may be presented in many different ways. For example, the individual nozzles in each group may be arranged in a compact arrangement and having respective connections to the fluid supply line as illustrated. Alternatively, an integrated spray body having a plurality of nozzles may be connected to the fluid supply line by a single connection, wherein the nozzles are selected by a valve and/or by rotating the spray body.

References to 'nozzle sets' hereinafter is intended to refer to one or more nozzles from each of the nozzle groups 20 to include spaced nozzles, or combination of nozzles, of the same type or having the same flow characteristics, along the boom 18. A nozzle set may include a combination of different nozzles (21, 22, or 21+22) from each nozzle group 20 or only single nozzles (21, 22) from each nozzle group 20. The reference number 21' will refer to a nozzle set comprising all nozzles 21. The reference number 22' will refer to a nozzle set comprising all nozzles 22. The reference number 21+22' will refer to a nozzle set comprising a combination of all nozzles 21 and all nozzles 22. The embodiment illustrated in FIGS. 7 through 9 has nozzle groups with four nozzles each resulting in fifteen different nozzle sets (see FIG. 9) which includes the different combinations of nozzles within the group.

Figure 3:
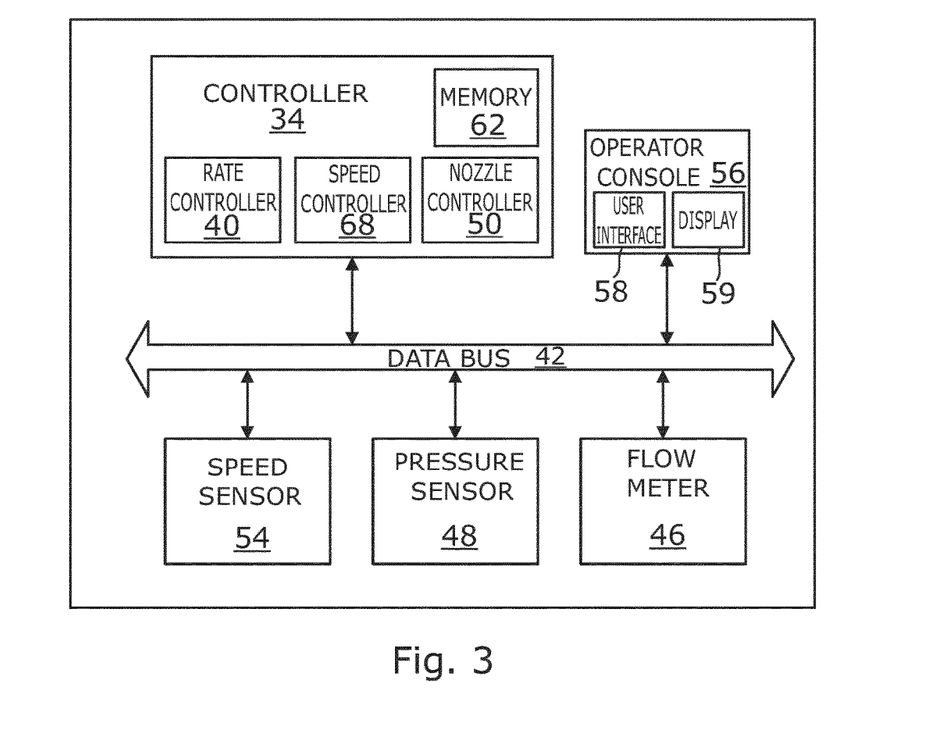
Figure 4:
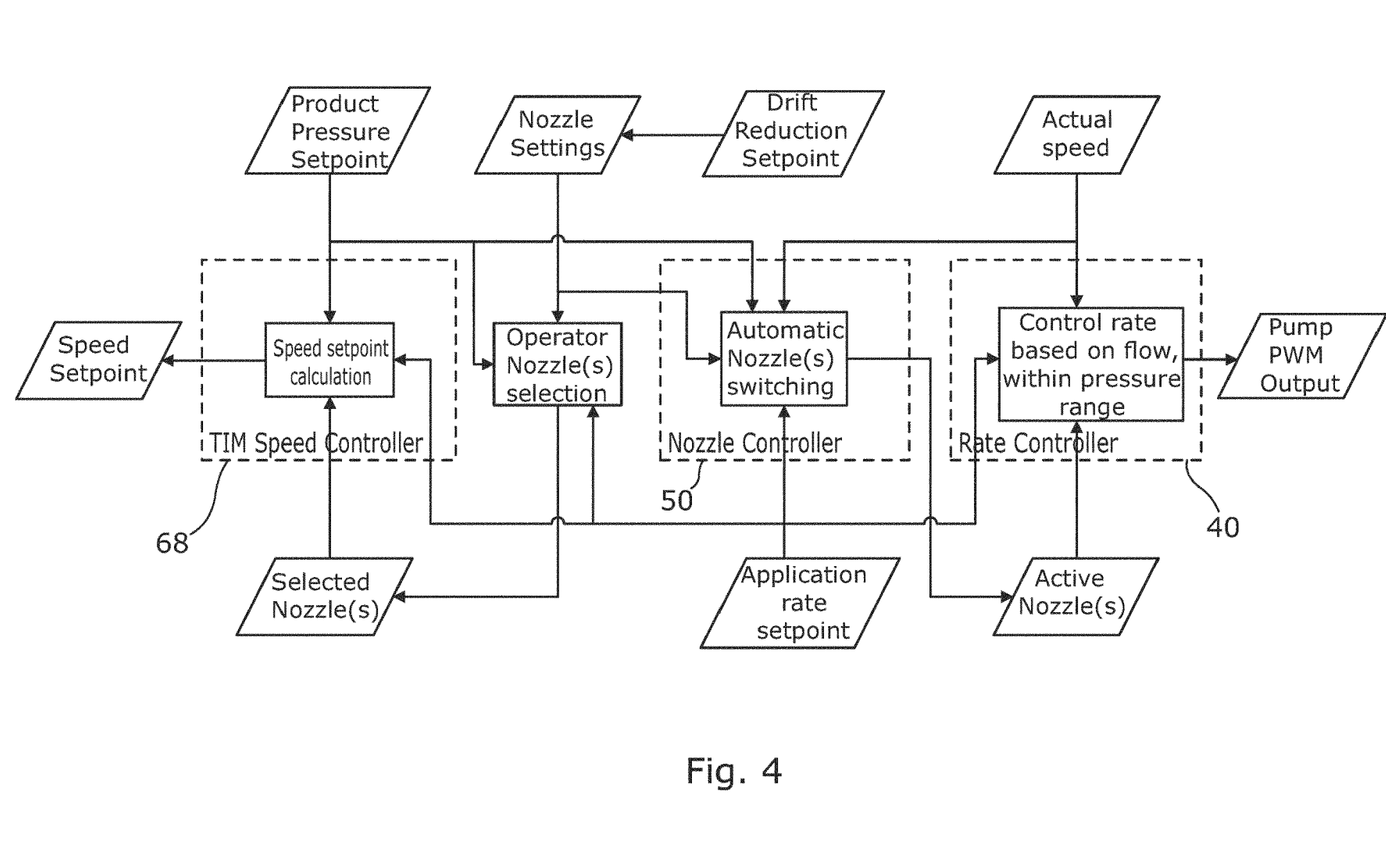
FIG. 4 is functional flow diagram showing various subsystems of a spraying machine in accordance with some embodiments.

With reference to FIG. 3, the sprayer machine 10 further comprises a speed sensor 54 which senses the forward speed of the machine 10 and communicates this to controller 34 via databus 42. The speed sensor 54 may be a standalone sensor attached to the sprayer 14 or tractor 12 (radar sensor) or may take a ground speed signal from an on-board satellite positioning system.

The tractor 12 further comprises an operator console 56 which includes a user interface 58 in the form of a touch screen or a keyboard for example, and a display 59. If embodied in a self-propelled sprayer, it should be understood that the user interface and display is located in the cab of such. In another embodiment, the user interface and display are embodied in a smart device which may be in wireless communication (by Bluetooth for example) with the controller 34 and located in the operator cab.

Rate Control

Turning to aspects of the control functionality of controller 34 and starting with rate control, the rate controller 40 controls the output of the pump 38 to maintain a target flow q to meet the application rate setpoint Q. Calculation of the pump output may be performed with the following values:

| Application rate setpoint | Q |
|---|---|
| Actual forward speed | $v_a$ |
| Actual product flow | $q_a$ |
| Operating width | w |
| Nozzle reference pressure of active nozzle set | $p_{x-ref}$ |
| Nozzle reference flow of active nozzle set | $q_{x-ref}$ |
| Product pressure setpoint | $p_t$ |

Pump control signals generated by the rate controller 40 may be pulse width modulated.

Figure 7:
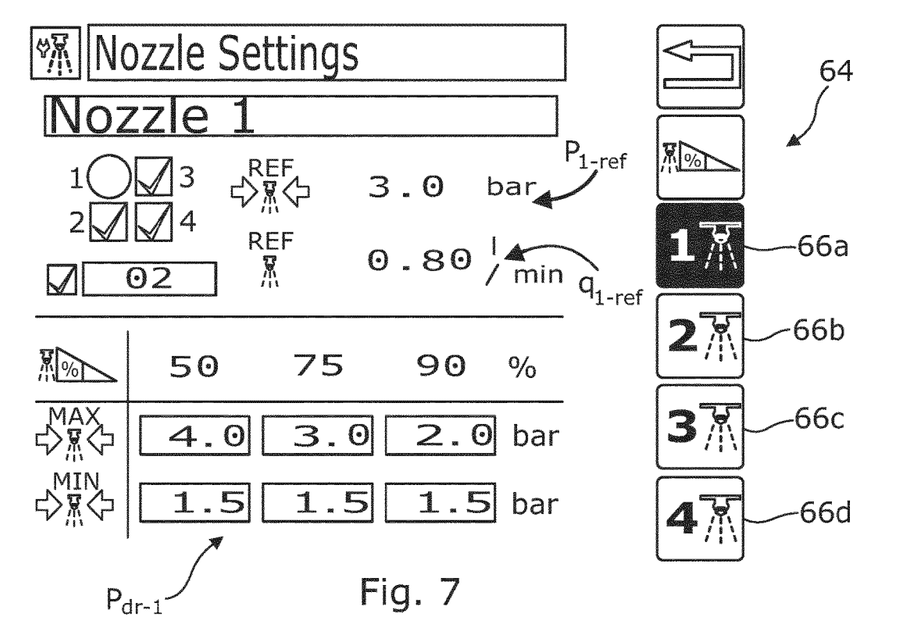
FIGS. 7 through 9 each show a screen from the operator console of the spray machine of FIG. 4; and, FIG. 10 is a flow chart illustrating a method of operating a sprayer machine in accordance with some embodiments.
Figure 8:
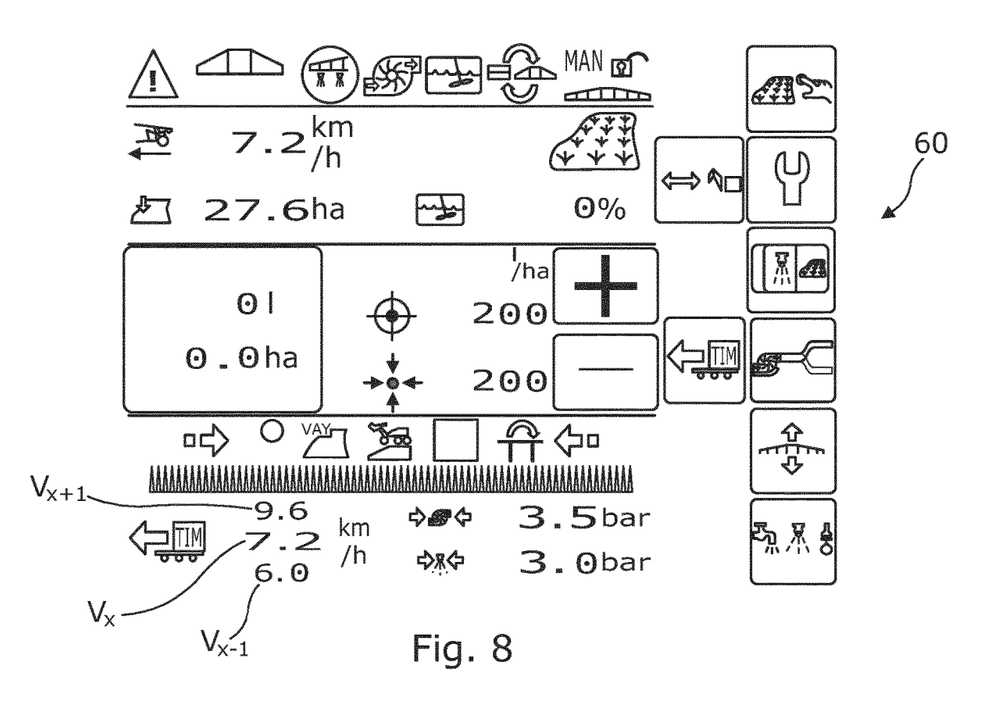
Figure 9:
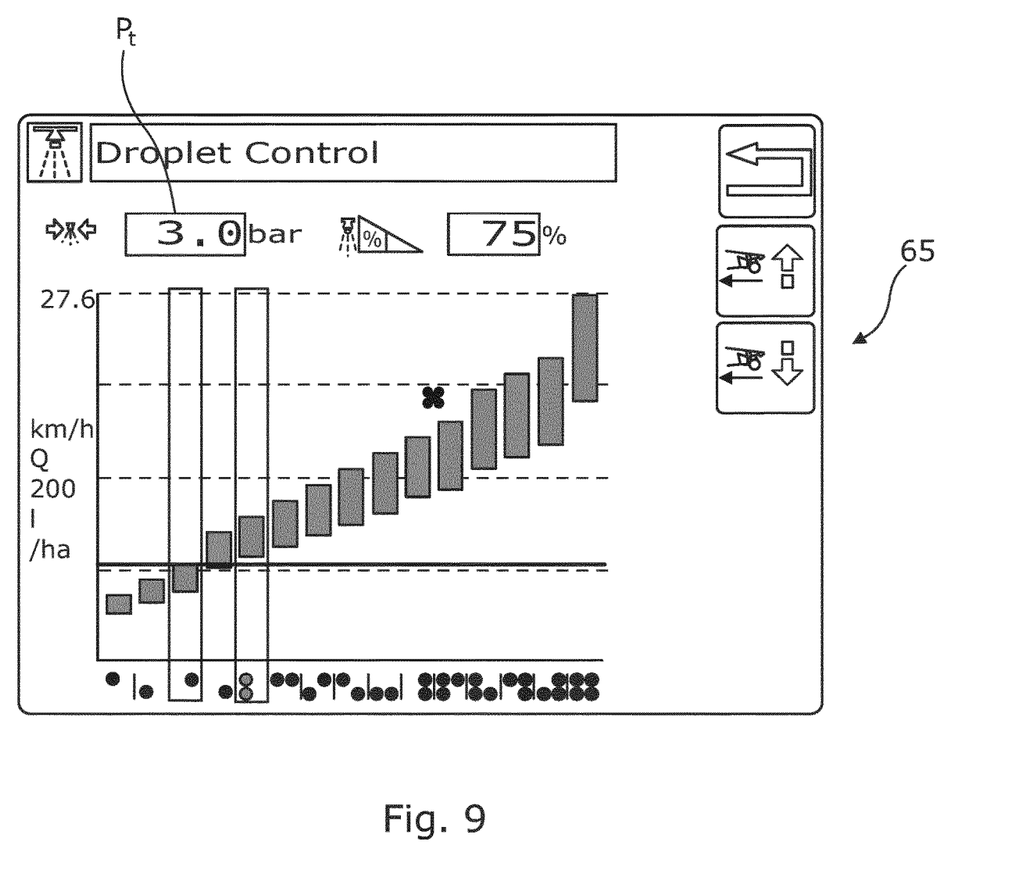

The application rate setpoint Q is entered by the operator and stored by the controller 34. FIGS. 7 through 9 each show a screen from respective viewing modes of the operator console 56. FIG. 7 shows a Nozzle Settings screen 64, FIG. 8 shows a Spraying Control Main screen 60, and FIG. 9 shows a Droplet Control screen 65.

In the embodiment corresponding to the screens shown in FIGS. 7 through 9, it should be appreciated that the example includes an arrangement with nozzle groups having four individual nozzles (labelled 'Nozzle 1', etc.) rather than the two nozzles shown in FIGS. 1 and 2. The Spraying Control main screen 60 allows the operator to set the application rate setpoint Q. The arrangement shown includes buttons 60a, 60b for entering the application rate set point Q which, in this example, is shown as being set at 200 l/ha.

The actual forward speed $v_a$ is generated by the speed sensor 54 or equivalent device. The actual product flow $q_a$ is generated by the flow meter 46. The operating width w (corresponding to the active nozzles) and nozzle spacing z is stored in the memory 62.

In the Nozzle Settings screen 64, the operator can enter a nozzle reference pressure $p_{x-ref}$ and nozzle reference flow $q_{x\text{-}ref}$ for each nozzle available in the group. In the example shown, 'Nozzle 1' is selected, a reference pressure $p_{1\text{-}ref}$ of 3.0 bar is entered, and a reference flow (at 3 bar) a $q_{1\text{-}ref}$ is entered as 0.8 l/min. The reference pressure $p_{1\text{-}ref}$ and reference flow $q_{1\text{-}ref}$ enable the controller 34 to determine a predicted flow rate at a given pressure when Nozzle 1 is selected. The same information is entered for the other available nozzles in the group.

The Droplet Control screen 65 allows an operator to enter the product pressure set point $p_t$ that represents a target pressure in the fluid delivery line 36.

Using these constants and variables, the rate controller 40 controls the pump 38 to deliver the correct flow to apply the chemical solution at the target rate Q. It will be appreciated that as the variables change, this affects the control of the pump 38. For example, if the target rate setpoint Q is increased, then the pump output (and system pressure p) will be increased in response.

Drift Reduction Settings

Figure 5:
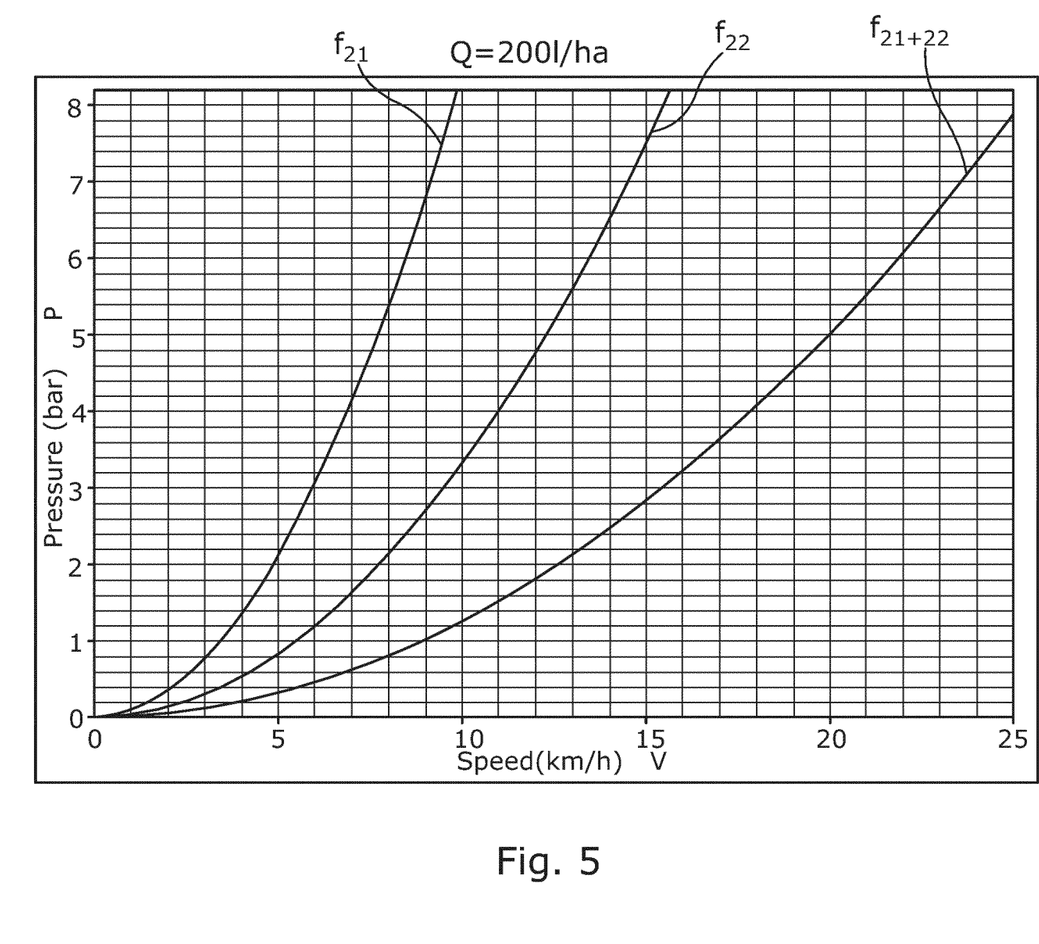
FIG. 5 is a plot of system pressure against forward speed for a fixed target application rate for three different nozzle combinations (nozzle 21, nozzle 22, and nozzle 21+22)

As forward speed v is increased, the required rate q increases and so the output of pump 38 and the operating pressure p is increased. A relationship between system pressure p and forward speed v for different nozzle sets at a constant target rate Q is shown in FIG. 5. A first plot $f_{21}$ corresponds to the first nozzle set 21', a second plot $f_{22}$ corresponds to the second nozzle set 22', and a third plot $f_{21+22}$ corresponds to the third nozzle set 21+22'.

As mentioned in the background section above, drift-reducing technology has led to the introduction of drift reduction classes for nozzles in which marketed nozzles are certified as meeting drift reduction classes, for example 50%-, 75%-, 90%-drift reducing, when operated within specified pressure ranges. By way of example, and with reference to the nozzles 21, 22, example upper pressure limits may be assigned as per Table 1 below.

TABLE 1

| Nozzle | Upper pressure limit per Drift Reduction Class (bar) | | |
|---|---|---|---|
| | 50% | 75% | 90% |
| Nozzle 21 | 7.0 | 4.0 | 2.5 |
| Nozzle 22 | 8.0 | 6.0 | 3.0 |

A minimum operating pressure may also be assigned to ensure that the output spray is of a sufficient quality. In one embodiment, the entering of a minimum operating pressure per drift reduction class per nozzle is made mandatory for the operator.

In the illustrated embodiment, the controller 34 receives and stores for each nozzle 21, 22 an upper pressure limit for each of three drift reduction classes as shown above. Also, a lower pressure limit is entered for each of three drift reduction classes for each nozzle.

The upper pressure limits for each nozzle operating under each drift reduction class can be entered into the controller 34 by the user using the operator console 56 and Nozzle Settings screen 64. Alternatively, the controller 34 may store a lookup table of different nozzles and their corresponding operating parameters for different drift reduction classes, and retrieve the operating parameters based on an identification of the nozzle type.

The Nozzle Settings screen 64 allows the operator to enter the upper and lower pressure limits $p_{dr\text{-}1}$ for Nozzle 1. In this example, the operator has entered an upper pressure limit of 3.0 bar for the 75% drift reduction class, and a lower pressure limit of 1.5 bar. The operator can switch from nozzle to nozzle using buttons 66a to 66d shown on the right-hand side of FIG. 7. For each nozzle set the operator can enter upper and lower pressure limits for each drift reduction class.

In operation, the controller 34 or the operator selects one of the drift reduction classes $c_{50}$, $c_{75}$, $c_{90}$. The controller 34 operates the sprayer 14 to indirectly maintain the operating pressure p between the lower and upper pressure limits of the selected drift reduction class by controlling speed, wherein the speed is controlled according to speed setpoints that are determined based at least in part on the drift reduction pressure limits $p_{dr\text{-}}$. See below for a more detailed explanation of speed setpoints.

In one embodiment, the controller 34 is configured to select one of the drift reduction classes based upon a location identifier which may be provided by a global position system in conjunction with an application map having a plurality of regions, each region being associated with a specific drift reduction class. In other words, the drift reduction class selected by the controller 34 is determined by the position of the machine 10 in relation to the application map.

In an alternative, more primitive, embodiment, the pump 38 is controlled to maintain the pressure p below the upper pressure limit of the selected or active drift reduction class. However in a preferred embodiment, the drift reduction parameters $p_{dr}$ are embedded in the nozzle settings to calculate speed setpoints and speed ranges which will be described in more detail below.

Speed Setpoints

The controller 34 embodies a speed controller 68 which is operable to generate speed setpoints $v_x$, which serve to command a forward speed of the sprayer machine 10 or to indicate an optimum forward speed v to the operator to deliver the target rate Q without exceeding the operating parameters of a selected drift reduction class c. Calculation of each speed setpoint associated with a given nozzle set may be performed with the following values:

| | |
|---|---|
| Application rate setpoint | Q |
| Product pressure setpoint | $p_t$ |
| Operating width | w |
| Nozzle spacing | z |
| Nozzle reference pressure of active nozzle set | $p_{x\text{-}ref}$ |
| Nozzle reference flow of active nozzle set | $q_{x\text{-}ref}$ |
| Pressure range (max and min) of active nozzle set | $p_{dr\text{-}x}$ |

The speed setpoints $v_x$ are calculated for each nozzle set and each drift reduction class. The listed variables and constants are received by the controller 34 as described above in relation to the flow rate control. The upper and lower pressure limits $p_{dr\text{-}x}$ associated with each drift reduction class are entered through the operator console 56 as also described above.

Although the speed setpoints $v_x$ may serve only as displayed indications of an optimum driving speed v for the selected nozzle set, this disclosure lends itself particularly well to TIM systems wherein the speed setpoints $v_x$ are communicated by ISOBUS link 32 to the tractor controller 28 and serve as speed commands that are dependent upon the selected nozzle set.

With reference to FIG. 8, the current speed setpoint $v_x$ may be displayed on the Spraying Control Main screen 60 together with the next lowest and next highest speed setpoints $v_{x-1}$, $v_{x+1}$, which indicate to the operator the next available speed setpoints at the selected drift reduction class. In this TIM-based system, the operator needs simply to request a step up or step down in speed v to change between speed setpoints $v_x$, which ensures the application rate Q and drift reduction class requirements can be met with the available nozzles.

Figure 6:
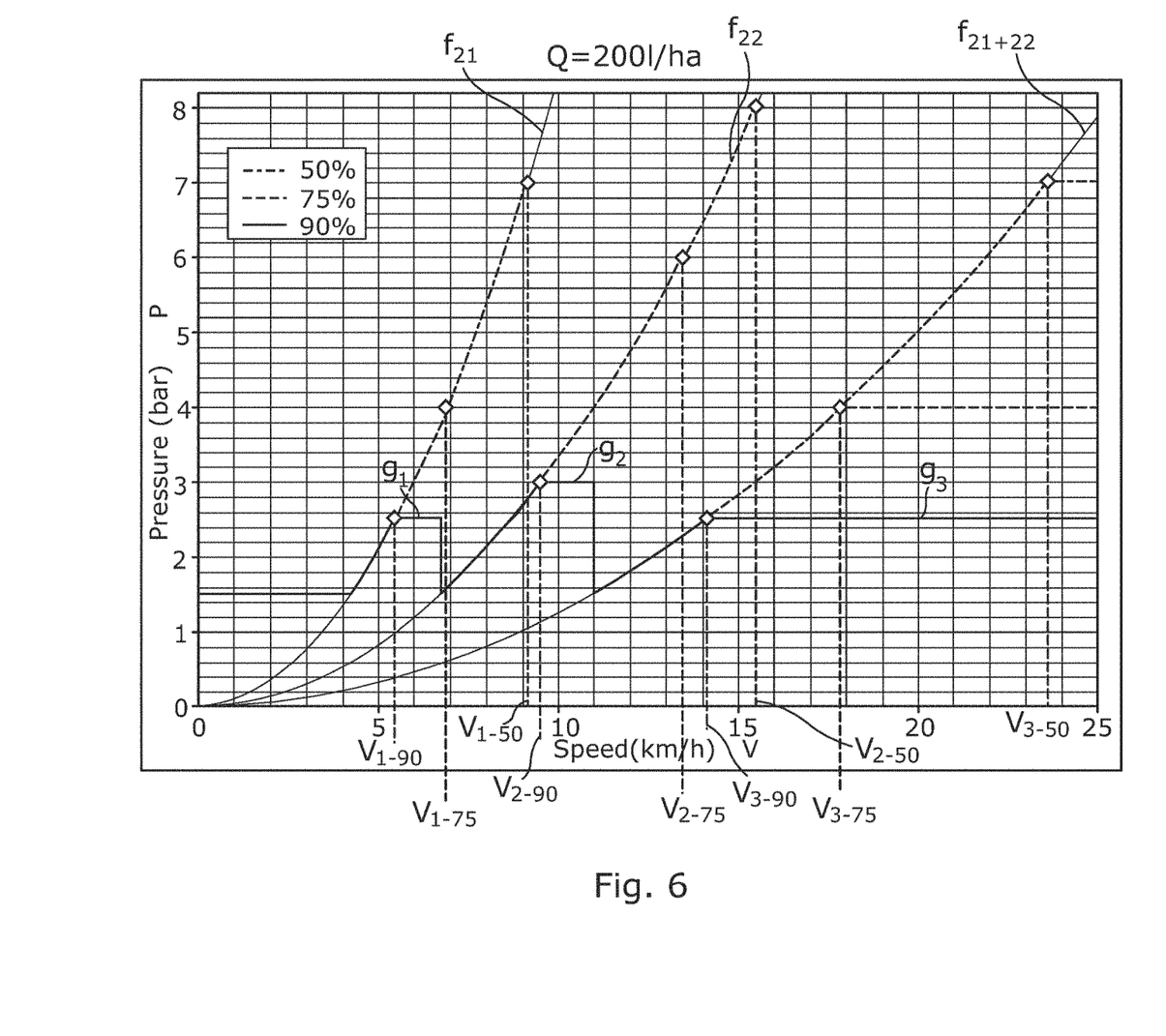
FIG. 6 is the same plot shown in FIG. 5, overlaid with nozzle selection and speed setpoints for 50%, 75% and 90% drift reduction conditions.

Returning to the embodiment of FIG. 2 having first nozzle set 21', second nozzle set 22', and third nozzle set 21+22', the three corresponding pressure-speed plots of FIG. 5 are overlaid with speed setpoints $v_x$ in FIG. 6. As can be seen from FIG. 6, the speed setpoints correspond to the upper pressure limits for the selected nozzle set and drift reduction class as per Table 1 above. Advantageously, this causes the sprayer machine 10 to operate at an appropriate forward speed v to meet the drift reduction parameters $p_{dr}$ and target rate Q.

The speed setpoints $v_x$ depend, inter alia, upon the product pressure setpoint $p_t$ and the pressure range for the selected nozzle and the selected drift reduction class. For a selected nozzle set $n_x$, a selected drift reduction class $c_x$, and application rate setpoint Q, the speed setpoint $v_x$ corresponds to the product pressure setpoint $p_t$ unless the product pressure setpoint $p_t$ falls outside of the pressure range $p_{dr\text{-}range}$ for the selected drift reduction class and nozzle set. If the product pressure setpoint $p_t$ does falls outside of the pressure range $p_{dr\text{-}range}$, then the speed setpoint $v_x$ corresponds to the upper or lower pressure limits for the selected drift reduction class $c_x$ and nozzle set $n_x$. In other words, the product pressure setpoint $p_t$ is trimmed if it falls outside of the pressure range permitted by the selected drift reduction class and nozzle set.

Returning to FIG. 6, starting with a drift reduction class of 50% ($c_{50}$) it can be seen from the upper pressure limit $p_d$, for nozzle set 21' is set at 7.0 bar, resulting in a speed setpoint $v_{1\text{-}50}$ of 9.2 km/h. The corresponding upper pressure limit for nozzle set 22' is set at 8.0 bar, which gives a speed setpoint $v_{2\text{-}50}$ of 15.5 km/h. The corresponding upper pressure limit for the third nozzle set 21+22' is dictated by the nozzle with the lowest upper pressure limit which is nozzle set 21'. As such the corresponding upper pressure limit for the third nozzle set 21+22' is set at 7.0 bar, resulting in a speed setpoint $v_{3\text{-}50}$ of 23.6 km/h.

For the more stringent drift reduction classes, the upper pressure limits for the respective nozzle sets are reduced due to the requirement for a coarser spray quality. At 75% drift reduction, respective speed setpoints $v_{1\text{-}75}$, $v_{2\text{-}75}$, $v_{3\text{-}75}$ of 5.9 km/h, 13.4 km/h, and 17.8 km/h are calculated for the nozzle sets 21', 22', and 21+22'.

For both the 50% and 75% drift reduction classes, a continuous speed range can be achieved between 4.2 km/h to 17.8 km/h wherein it is possible to apply pesticide at the target rate Q (200 l/ha in this example) while meeting the drift reduction requirements. However, speed gaps $g_1$, $g_2$, represented by the horizontal lines in FIG. 6 result from no nozzle set being available to deliver the target rate Q at those speeds under the requirements for 90% drift reduction. Over these speed gaps $g_1$, $g_2$, the pesticide is under applied.

It should be appreciated that the speed setpoints may be adapted in response to a change in the input parameters. For example, if the available nozzle sets are changed then this may accompany a change in upper pressure limits associated with the drift reduction classes. In turn, the speed setpoints would be adapted accordingly.

The generation and use of speed setpoints $v_x$ facilitates simple control of the sprayer forward speed v and avoids a situation of under applying the pesticide and/or breaching the thresholds associated with drift reduction classes. When implemented in conjunction with TIM functionality, the speed setpoints $v_x$ serve as discreet selectable speeds that deliver an appropriate spray application for the respective nozzle sets available. Although automatic selection of nozzle set may be based upon the measured actual speed $v_a$ (see below), the selection of forward speed v is commanded by an operator, and the forward speed (at least under a TIM arrangement) may be selected from discrete values that correspond to an optimum speed for the nozzle sets available.

Alternatively, the speed setpoints $v_x$ serve as upper speed limits for selected nozzle sets, wherein the speed setpoint is stepped up or down in response to a change in selected nozzle set upon command of an operator.

In yet another alternative embodiment, the speed setpoints $v_x$ are displayed as a guide to the driver. In this case the controller 34 is configured to generate a driver alert in the form of an audible alert and/or a visual alert in response to receiving a speed command from the driver that corresponds to a speed that exceeds the displayed speed setpoint. Moreover, a driver alert may be provided in the case of an operator commanding a switch in nozzle set wherein the current speed cannot deliver the application rate Q at the required drift reduction class $c_x$.

Although the generation of speed setpoints $v_x$ has been described in relation to a sprayer machine having multiple nozzle sets, a more primitive arrangement having only a single nozzle set may also benefit from the generation of speed setpoints to either command a speed or indicate an optimal driving speed for the various drift reduction classes $c_x$ stored on the controller.

Figure 10:
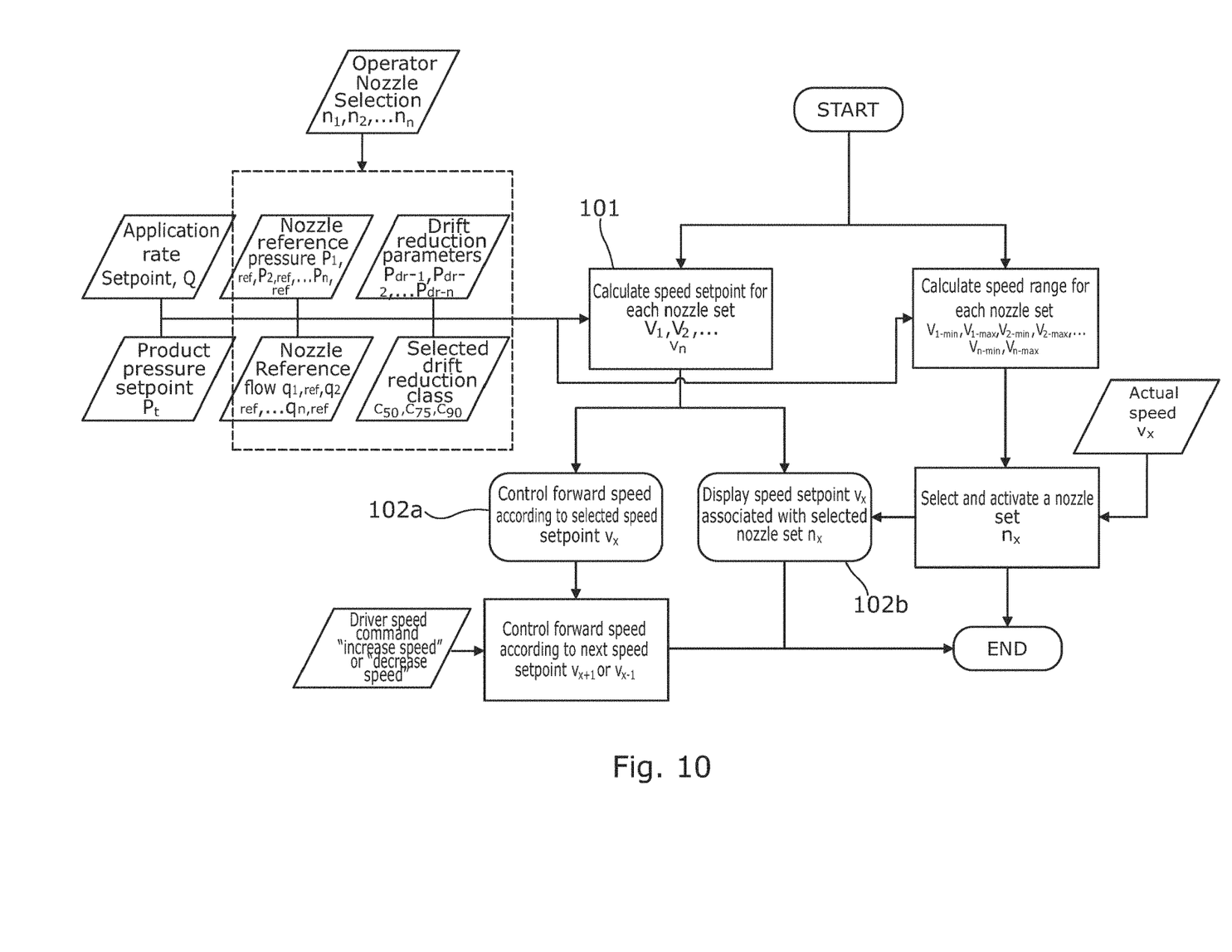

An embodiment of a method of controlling the sprayer 14 is shown in FIG. 10, wherein the method comprises receiving an application rate setpoint Q, an upper pressure limit $p_{dr\text{-}x}$, a nozzle reference flow $q_{x\text{-}ref}$, and a nozzle reference pressure $p_{x\text{-}ref}$ calculating a speed setpoint $v_x$ based upon the application rate setpoint Q, the nozzle reference flow $q_{x\text{-}ref}$, the nozzle reference pressure $p_{x\text{-}ref}$, and the upper pressure limit $p_{dr\text{-}x}$ (act 101); and controlling at least one of a forward speed (act 102a) and a display (act 102b) based upon the speed setpoint $v_x$.

Automatic Nozzle Switching

As mentioned above, nozzle controller 50 is embedded in controller 34 and serves to selectively activate and deactivate the independently controllable nozzles 21, 22 in an automatic manner. Automatic nozzle selection may be performed with the following values, which are input into nozzle controller 50:

| | |
|---|---|
| Actual speed | $v_a$ |
| Application rate setpoint | Q |
| Product pressure setpoint | $p_t$ |
| Operating width | w |
| Nozzle spacing | z |
| Nozzle reference pressure of each available nozzle set | $p_{x\text{-}ref}$ |
| Nozzle reference flow of each available nozzle set | $q_{x\text{-}ref}$ |
| Pressure range (max and min) of active nozzle set | $p_{dr\text{-}x}$ |

Speed ranges for each available nozzle set are calculated by the nozzle controller 50 and used to select an appropriate nozzle set based on the sensed forward speed v and optionally the selected drift reduction class. The listed variables and constants are received by the controller 34 as described above in relation to the flow rate control. The upper pressure limits $p_{dr\text{-}x}$ associated with each drift reduction class are entered through the operator console 56 as also described above. The actual speed $v_a$ is provided by speed sensor 48 or other suitable means such as a satellite positioning system.

In contrast to known automatic nozzle switching systems, the nozzle selection and activation is based upon a measured actual forward speed which is referenced against the calculated speed ranges. The measured pressure p and flow rate q are used only for the rate controller.

The lower and upper speed limits of each speed range $v_{x\text{-}min}$, $v_{x\text{-}max}$, for each nozzle set preferably correspond to the speed setpoints $v_x$ calculated as described above, wherein the speed ranges for determining nozzle selection reside between the speed setpoints $v_x$. Although the speed setpoints $v_x$ are calculated based upon reference data and upper pressure limits $p_{dr}$ relating to the available nozzles and drift reduction classes, the nozzle selection is based on actual forward speed v rather than a sensed system pressure p.

Like the speed setpoints described above, the speed ranges are adapted in response to the input parameters including application rate setpoint Q.

In summary, the above-described agricultural sprayer machine and variations thereof embody a number of concepts which can be implemented in isolation or in various combinations, and in a spraying machine, control system, or a method of operating a sprayer machine. The receiving and storing of operating parameters that relate to a plurality of drift reduction classes allows, for example, the control of automatic nozzle switching or speed control, taking into account the requirements for the drift reduction classes. The generation of speed setpoints based on selected nozzles and optionally on drift reduction parameters allows an operator to control a sprayer with the assurance that the speed suits the nozzles and/or the legislative parameters of the task in hand. The use of a measured forward speed to control nozzle selection delivers a responsive operating system.

From reading the present disclosure, other modifications will be apparent to persons skilled in the art. Such modifications may involve other features which are already known in the field of agricultural sprayers and component parts thereof and which may be used instead of or in addition to features already described herein.

The invention claimed is:

1. An agricultural spraying machine, comprising:
  a fluid delivery network with a pump in hydraulic communication with a plurality of spaced-apart nozzles; and
  an electronic controller configured to:
    receive and store an upper pressure limit and a lower pressure limit for each nozzle of the plurality of spaced-apart nozzles for each one of a plurality of drift reduction classes, wherein each drift reduction class of the plurality of drift reduction classes references a percentage by which drift is reduced when a given nozzle is operating between the upper pressure limit and the lower pressure limit of the drift reduction class;
    receive a selection of a drift reduction class of the plurality of drill reduction classes; and
    based on the selected drift reduction class of the plurality of drift reduction classes, control at least one of the pump, a vehicle speed, or nozzle selection to maintain an operating pressure of the selected nozzles between the upper and lower pressure limits of selected drift reduction class.

2. The agricultural spraying machine of claim 1, further comprising a pressure sensor configured to measure a pressure of the fluid delivery network.

3. The agricultural spraying machine of claim 1, further comprising a user interface in communication with the controller, wherein the user interface is operable to receive the upper pressure limit and the lower pressure limit for each nozzle of the plurality of spaced-apart nozzles for each one of the plurality of drift reduction classes.

4. The agricultural spraying machine of claim 1, wherein the controller is configured to:
  receive an application rate setpoint, a nozzle reference flow, and a nozzle reference pressure;
  calculate an active speed setpoint based at least in part upon the application rate setpoint, the nozzle reference flow, the nozzle reference pressure, and the operating parameter of each nozzle of the plurality of spaced-apart nozzles for the selected one of the plurality of drift reduction classes.

5. The agricultural spraying machine of claim 4, wherein the controller is configured to receive a product pressure setpoint, and wherein the active speed setpoint varies based on the product pressure setpoint.

6. The agricultural spraying machine of claim 4, wherein the controller is configured to limit a forward speed of the machine at or below the active speed setpoint.

7. The agricultural spraying machine of claim 4, wherein the controller is configured to display the active speed setpoint on the display.

8. The agricultural spraying machine of claim 1, wherein the plurality of spaced-apart nozzles comprises a plurality of nozzle groups, wherein each nozzle group comprises a plurality of nozzles that can be independently activated, wherein, when activated, a nozzle from the plurality of nozzles is put into hydraulic communication with the fluid delivery network.

9. The agricultural spraying machine of claim 8, wherein the controller is configured to automatically select and activate at least one nozzle from each nozzle group based upon the selected drift reduction class.

10. The agricultural spraying machine of claim 8, wherein a nozzle set comprises at least one nozzle from each nozzle group, and wherein the controller is configured to calculate a speed range for each of the plurality of drift reduction classes, and to automatically select and activate a nozzle set based upon a sensed actual speed of the agricultural spraying machine, the speed range, and the selected drift reduction class.

11. The agricultural spraying machine of claim 1, wherein the controller is configured to automatically select one of the plurality of drift reduction classes based upon a location identifier.

12. A method of controlling an agricultural spraying machine having a fluid delivery network with a pump in hydraulic communication with a plurality of spaced-apart nozzles, the method comprising:
  receiving and storing an upper pressure limit and a lower pressure limit for each nozzle of the plurality of spaced-apart nozzles for each one of a plurality of drift reduction classes, wherein each drift reduction class of the plurality of drift reduction classes references a percentage by which drift is reduced when a given nozzle is operating between the upper pressure limit and the lower pressure limit of the drift reduction class;
  selecting a drift reduction class of the plurality of drift reduction classes; and
  based on the selected drift reduction class of the plurality of drift reduction classes, controlling at least one of the pump, a vehicle speed, or nozzle selection to maintain an operating pressure of the selected nozzles between the upper and lower pressure limits of selected drift reduction class.

13. The method of claim 12, further comprising:
receiving an application map having a plurality of regions each associated with one drift reduction class of the plurality of drift reduction classes;
receiving a location identifier; and
selecting the drift reduction class of the plurality of drift reduction classes based upon the application map and the location identifier.

14. The method of claim 12, further comprising:
receiving an application rate setpoint, a nozzle reference flow, and a nozzle reference pressure; and
calculating a speed setpoint for each one of the plurality of drift reduction classes based at least in part upon the application rate setpoint, the nozzle reference flow, the nozzle reference pressure, and the upper and lower pressure limits of each of the plurality of spaced-apart nozzles for the selected drift reduction class.

15. The method of claim 14, further comprising:
receiving a nozzle reference flow and a nozzle reference pressure for each one of a plurality of nozzle sets of the plurality of spaced-apart nozzles; and
calculating a respective speed setpoint for each one of the plurality of nozzle sets for each of the plurality of drift reduction classes.

16. The agricultural spraying machine of claim 1, wherein the controller is configured to:
cause the upper and lower pressure limits of selected drift reduction class to be displayed on a display.

\* \* \* \* \*